United States Patent
Morris (10) Patent No.: US 7,315,774 B2
(45) Date of Patent: Jan. 1, 2008

(54) JERK MANAGEMENT USING MULTIVARIABLE ACTIVE DRIVELINE DAMPING

(75) Inventor: Robert L. Morris, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 9 days.

(21) Appl. No.: 11/386,315

(22) Filed: Mar. 22, 2006

(65) Prior Publication Data

US 2007/0225889 A1 Sep. 27, 2007

(51) Int. Cl.
  *G06F 7/00* (2006.01)
(52) U.S. Cl. .......................................... 701/53; 701/87
(58) Field of Classification Search ............ 701/51–66, 701/102, 103, 104, 70–87; 477/115, 154, 477/156
See application file for complete search history.

(56) References Cited

U.S. PATENT DOCUMENTS

| | | | |
|---|---|---|---|
| 5,325,740 A | 7/1994 | Zhang et al. | |
| 6,188,943 B1 | 2/2001 | Uchida et al. | |
| 6,266,597 B1 | 7/2001 | Russell et al. | |
| 6,543,414 B2 | 4/2003 | O'Neil et al. | |
| 6,574,535 B1 * | 6/2003 | Morris et al. | 701/22 |
| 7,003,394 B2 * | 2/2006 | Takahashi et al. | 701/104 |

\* cited by examiner

*Primary Examiner*—Richard M. Camby (57) ABSTRACT

A multivariable feedback control approach to actively dampen magnitude of jerks in a powertrain system using multiple torque-control devices is offered. To manage jerks, a desired axle torque is restricted when a torque reversal occurs. When the vehicle operator or the system executes a command that requires change in direction of torque, the desired axle torque is limited to a low level until the lash estimate has changed accordingly. During this transition time, active damping controls driveline component speeds so that the effect of lash take-up is minimized. After lash take-up occurs, the desired axle torque proceeds without restriction. The invention includes determining a desired axle torque, an output speed of the transmission, and an output speed of a driven wheel of the driveline. One of the devices is controlled based upon a time-rate change in the desired axle torque.

18 Claims, 6 Drawing Sheets

JERK MANAGEMENT USING MULTIVARIABLE ACTIVE DRIVELINE DAMPING

TECHNICAL FIELD

This invention pertains generally to hybrid powertrain control systems, and more specifically to controlling driveline jerk management by controlling multiple torque inputs.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the preferable gear ratios for wide range operation.

One hybrid powertrain architecture comprises a two-mode, compound-split, electromechanical transmission which utilizes an input member for receiving power from a prime mover power source and an output member for delivering power from the transmission. First and second motor/generators are operatively connected to an energy storage device for interchanging electrical power between the storage device and the first and second motor/generators. A control unit is provided for regulating the electrical power interchange between the energy storage device and the first and second motor/generators. The control unit also regulates electrical power interchange between the first and second motor/generators.

Engineers have a challenge in managing transitions in operating states of hybrid powertrain systems to minimize effect on vehicle driveability caused by driveline lash, or play, in the entire gear train. Actions wherein driveline torque is transitioned from a neutral torque to a positive or negative torque, or from a positive torque to a negative torque, can result in gear lash, and jerks, as slack is taken out of the driveline and driveline components impact one another. Excessive gear lash, jerks, and other related events may result in operator dissatisfaction, and can negatively affect powertrain and transmission reliability and durability.

Gear lash and jerks have the potential to occur during vehicle operations including: when the operator changes transmission gears, e.g. from neutral/park to drive or reverse, or when the operator tips into the throttle. Lash action occurs, for example, as follows: Torque-generative devices of the powertrain exert a positive torque onto the transmission input gears to drive the vehicle through the driveline. During a subsequent deceleration, torque input to the powertrain and driveline decreases, and gears in the transmission and driveline separate. After passing through a zero-torque point, the gears reconnect to transfer torque, in the form of motor braking, electrical generation, and others. The reconnection of the gears to transfer torque result in gear impact, with resulting jerks.

Hybrid powertrain systems such as the exemplary two-mode, compound-split, electro-mechanical transmission have multiple torque-generative devices. Coordinated control of the torque-generative devices is required to reduce driveline gear lash and jerks. Additionally, the exemplary hybrid powertrain system introduces a challenge of managing driveline transitions which may occur when one of the motor/generators transitions from operating in a motoring mode to operating in a generating mode.

Therefore, there is a need for a control scheme for hybrid powertrain systems such as the exemplary two-mode, compound-split, electromechanical transmission having multiple torque-generative devices which addresses the aforementioned issues related to driveline gear lash and jerks. This includes a scheme that is cognizant of driveline torque transitions which may occur when one of the motor/generators transitions from operating in a motoring mode to operating in a generating mode. There is a further need to develop a hybrid powertrain control system which can coordinate and manage power from the torque-generative devices in a manner which effectively uses on-board computing resources.

SUMMARY OF THE INVENTION

The invention provides a multivariable feedback control approach to actively dampen magnitude of jerks in a hybrid powertrain system, and other powertrain systems using multiple torque control devices.

To manage jerks, desired axle torque $T_{A\_DES}$ is restricted when a torque reversal occurs. If the vehicle operator or the system executes a command that requires the system to change from a positive torque to a negative torque, or a negative torque to a positive torque, the desired axle torque during the reversal is limited to a low level until the lash estimate has changed accordingly, i.e. from positive to negative, or negative to positive. During this transition time, active damping controls the response of the driveline component speeds so that the effect of lash take-up is minimized. After lash take-up occurs, the desired axle torque can proceed without restriction to the operator or system command.

Therefore, an aspect of the present invention includes a method and apparatus to control motive torque to a driveline of a hybrid powertrain system. The hybrid powertrain system comprises a plurality of torque-generative devices operably connected to a transmission operable to transmit motive torque to an axle of the driveline. The torque-generative devices preferably comprise electric machines, or motor/generators. The method includes determining a desired axle torque, an output speed of the transmission, and an output speed of a driven wheel of the driveline. One of the torque-generative devices is controlled based upon a time-rate change in the desired axle torque. Controlling each of the torque-generative devices preferably occurs when the output speed of the driven wheel is less than a predetermined value, such as during a vehicle launch from at or near zero vehicle speed.

An aspect of the invention includes determining the desired axle torque by monitoring operator input to an accelerator pedal, and to a brake pedal.

Another aspect of the invention includes controlling a transition between a torque-generative mode and an electric-generative mode to prevent driveline jerk when the torque-generative device comprises an electrical machine.

An aspect of the invention comprises controlling driveline torque during vehicle launch, or, during a change in a fixed gear ratio of a transmission of the powertrain.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
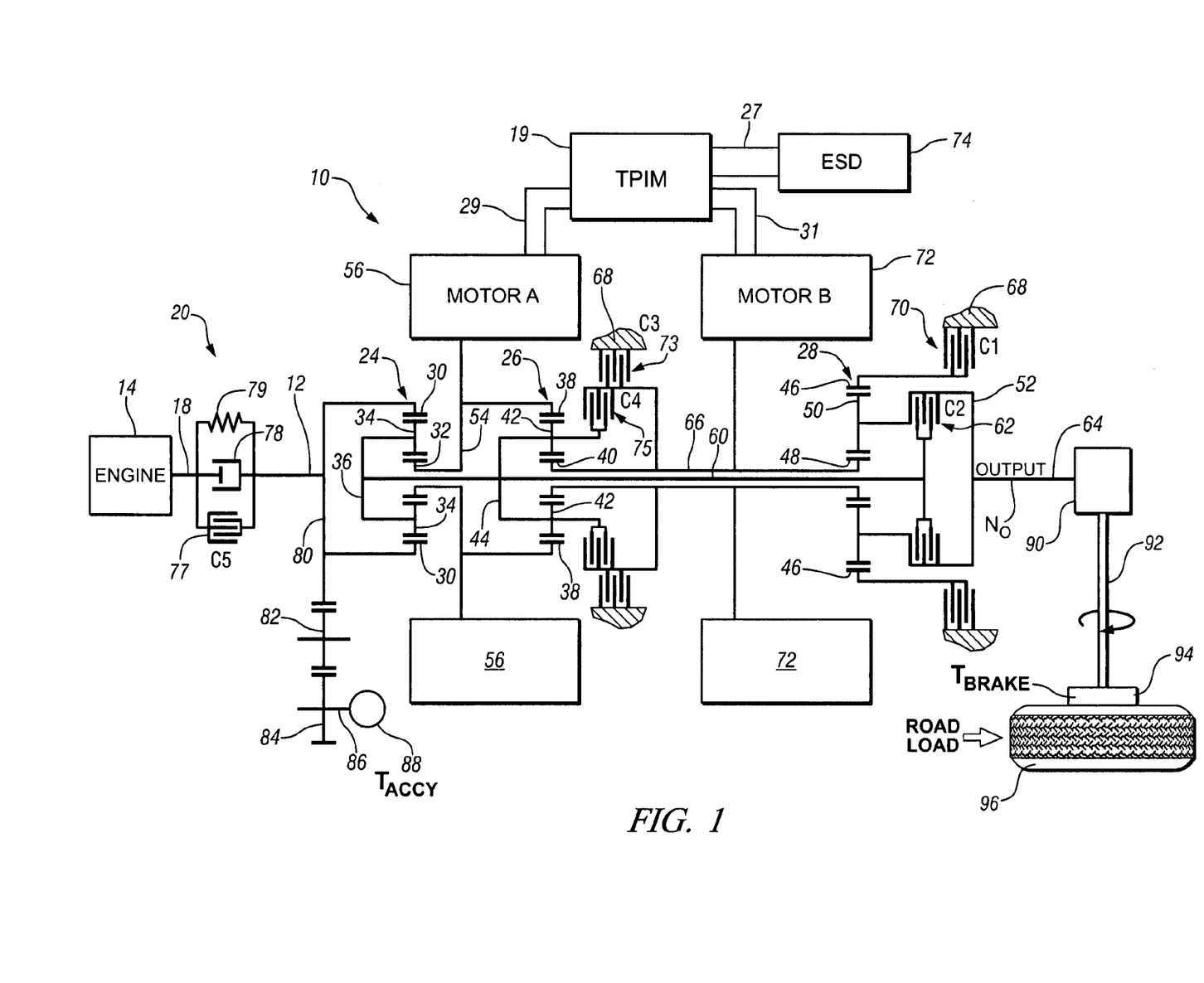
FIG. 1 is a schematic diagram of an exemplary powertrain, in accordance with the present invention.
Figure 2:
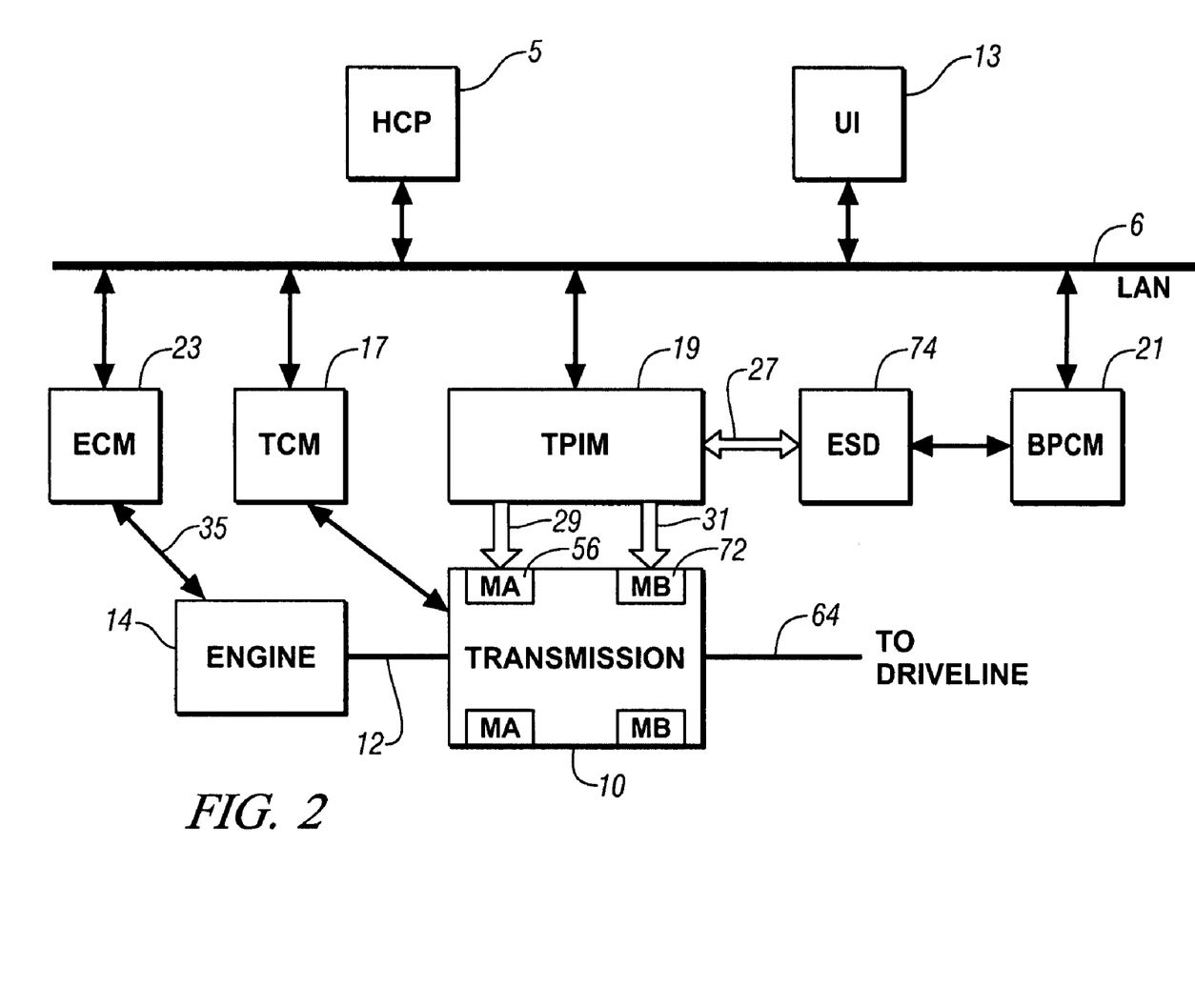
FIG. 2 is a schematic diagram of an exemplary control architecture and powertrain, in accordance with the present invention.

Referring now to the drawings, wherein the showings are for the purpose of illustrating the invention only and not for the purpose of limiting the same, FIGS. 1 and 2 show a system comprising an engine 14, transmission 10, control system, and driveline which has been constructed in accordance with an embodiment of the present invention.

Mechanical aspects of exemplary transmission 10 are disclosed in detail in commonly assigned U.S. Patent Application Publication No. U.S. 2005/0137042 A1, published Jun. 23, 2005, entitled *Two-Mode, Compound-Split Hybrid Electro-Mechanical Transmission having Four Fixed Ratios*, which is incorporated herein by reference. The exemplary two-mode, compound-split, electromechanical hybrid transmission embodying the concepts of the present invention is depicted in FIG. 1, and is designated generally by the numeral 10. The hybrid transmission 10 has an input member 12 that may be in the nature of a shaft which may be directly driven by an engine 14. A transient torque damper 20 is incorporated between the output shaft 18 of the engine 14 and the input member 12 of the hybrid transmission 10. The transient torque damper 20 preferably comprises a torque transfer device 77 having characteristics of a damping mechanism and a spring, shown respectively as 78 and 79. The transient torque damper 20 permits selective engagement of the engine 14 with the hybrid transmission 10, but it must be understood that the torque transfer device 77 is not utilized to change, or control, the mode in which the hybrid transmission 10 operates. The torque transfer device 77 preferably comprises a hydraulically operated friction clutch, referred to as clutch C5.

The engine 14 may be any of numerous forms of internal combustion engines, such as a spark-ignition engine or a compression-ignition engine, readily adaptable to provide a power output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the hybrid transmission 10 utilizes three planetary-gear sets 24, 26 and 28. The first planetary gear set 24 has an outer gear member 30 that may generally be designated as a ring gear, which circumscribes an inner gear member 32, generally designated as a sun gear. A plurality of planetary gear members 34 are rotatably mounted on a carrier 36 such that each planetary gear member 34 meshingly engages both the outer gear member 30 and the inner gear member 32.

The second planetary gear set 26 also has an outer gear member 38, generally designated as a ring gear, which circumscribes an inner gear member 40, generally designated as a sun gear. A plurality of planetary gear members 42 are rotatably mounted on a carrier 44 such that each planetary gear 42 meshingly engages both the outer gear member 38 and the inner gear member 40.

The third planetary gear set 28 also has an outer gear member 46, generally designated as a ring gear, which circumscribes an inner gear member 48, generally designated as a sun gear. A plurality of planetary gear members 50 are rotatably mounted on a carrier 52 such that each planetary gear 50 meshingly engages both the outer gear member 46 and the inner gear member 48.

Ratios of teeth on ring gears/sun gears are typically based upon design considerations known to skilled practitioners and outside the scope of the present invention. By way of example, in one embodiment, the ring gear/sun gear tooth ratio of the planetary gear set 24 is 65/33; the ring gear/sun gear tooth ratio of the planetary gear set 26 is 65/33; and the ring gear/sun gear tooth ratio of the planetary gear set 28 is 94/34.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to a first motor/generator 56, also referred to as 'Motor A'.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque transfer device 62 which, as will be hereinafter more fully explained, is employed to assist in the selection of the operational modes of the hybrid transmission 10. The carrier 52 of the third planetary gear set 28 is connected directly to the transmission output member 64.

In the embodiment described herein, wherein the hybrid transmission 10 is used in a land vehicle, the output member 64 is operably connected to a driveline comprising a gear box 90 or other torque transfer device which provides a torque output to one or more vehicular axles 92 or half-shafts (not shown). The axles 92, in turn, terminate in drive members 96. The drive members 96 may be either front or rear wheels of the vehicle on which they are employed, or they may be a drive gear of a track vehicle. The drive members 96 may have some form of wheel brake 94 associated therewith. The drive members each have a speed parameter, $N_{WHL}$, comprising rotational speed of each wheel 96 which is typically measurable with a wheel speed sensor.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the hybrid transmission 10. The sleeve shaft 66 is also continuously connected to a second motor/generator 72, also referred to as 'Motor B'.

All the planetary gear sets 24, 26 and 28 as well as the two motor/generators 56 and 72 are coaxially oriented, as about the axially disposed shaft 60. Motor/generators 56 and 72 are both of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope, i.e., the circumferential dimension, of the transmission 10 is minimized.

A torque transfer device 73 selectively connects the sun gear 40 with ground, i.e., with transmission housing 68. A torque transfer device 75 is operative as a lock-up clutch, locking planetary gear sets 24, 26, motors 56, 72 and the input to rotate as a group, by selectively connecting the sun gear 40 with the carrier 44. The torque transfer devices 62, 70, 73, 75 are all friction clutches, respectively referred to as follows: clutch C1 70, clutch C2 62, clutch C3 73, and clutch C4 75. Each clutch is preferably hydraulically actuated, receiving pressurized hydraulic fluid from a pump. Hydraulic actuation is accomplished using a known hydraulic fluid circuit, which is not described in detail herein.

The hybrid transmission 10 receives input motive torque from a plurality of torque-generative devices, including the engine 14 and the motors/generators 56 and 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module (TPIM) 19 via DC lines or transfer conductors 27. The TPIM 19 is an element of the control system described hereinafter with regard to FIG. 2. The TPIM 19 communicates with the first motor/generator 56 by transfer conductors 29, and the TPIM 19 similarly communicates with the second motor/generator 72 by transfer conductors 31. Electrical current is transferable to or from the ESD 74 in accordance with whether the ESD 74 is being charged or discharged. TPIM 19 includes the pair of power inverters and respective motor controllers configured to receive motor control commands and control inverter states therefrom for providing motor drive or regeneration functionality.

In motoring control, the respective inverter receives current from the DC lines and provides AC current to the respective motor over transfer conductors 29 and 31. In regeneration control, the respective inverter receives AC current from the motor over transfer conductors 29 and 31 and provides current to the DC lines 27. The net DC current provided to or from the inverters determines the charge or discharge operating mode of the electrical energy storage device 74. Preferably, Motor A 56 and Motor B 72 are three-phase AC machines and the inverters comprise complementary three-phase power electronics.

Referring again to FIG. 1, a drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the motor/generators 56 and/or 72 through planetary gear sets 24 and/or 26. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump and/or power take-off ('PTO') unit, designated either individually or collectively at 88, and comprise an accessory load.

Referring now to FIG. 2, a schematic block diagram of the control system, comprising a distributed controller architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and motors 56, 72. The distributed controller architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned controllers. There is a User Interface ('UI') 13 operably connected to a plurality of devices through which a vehicle operator typically controls or directs operation of the powertrain, including the transmission 10. Exemplary vehicle operator inputs to the UI 13 include an accelerator pedal, a brake pedal, transmission gear selector, and, vehicle speed cruise control. Each of the aforementioned controllers communicates with other controllers, sensors, and actuators via a local area network ('LAN') bus 6. The LAN bus 6 allows for structured communication of control parameters and commands between the various controllers. The specific communication protocol utilized is application-specific. By way of example, one communications protocol is the Society of Automotive Engineers standard J1939. The LAN bus and appropriate protocols provide for robust messaging and multi-controller interfacing between the aforementioned controllers, and other controllers providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, the HCP 5 generates various commands, including: an engine torque command, $T_{E\_CMD}$; clutch torque commands, $T_{CL\_N}$ for the various clutches C1, C2, C3, C4 of the hybrid transmission 10; and motor torque commands, $T_{A\_CMD}$ and $T_{B\_CMD}$, for the electrical motors A and B, respectively.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command, $T_{E\_CMD}$, from the HCP 5, and generates a desired axle torque, $T_{AXLE\_DES}$, and an indication of actual engine torque, $T_{E\_ACT}$, which is communicated to the HCP 5. For simplicity, ECM 23 is shown generally having bidirectional interface with engine 14 via aggregate line 35. Various other parameters that may be sensed by ECM 23 include engine coolant temperature, engine input speed ($N_E$) to a shaft leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques, $T_{CL\_N\_EST}$, for each of the clutches C1, C2, C3, and, C4 and rotational speed, $N_O$, of the output shaft 64. Other actuators and sensors may be used to provide additional information from the TCM to the HCP for control purposes.

The BPCM 21 is signally connected one or more sensors operable to monitor electrical current or voltage parameters of the ESD 74 to provide information about the state of the batteries to the HCP 5. Such information includes battery state-of-charge, Bat_SOC, and other states of the batteries, including voltage, $V_{BAT}$, and available power, $P_{BAT\_Min}$, and $P_{BAT\_Max}$.

The Transmission Power Inverter Module (TPIM) 19 includes a pair of power inverters and motor controllers configured to receive motor control commands and control inverter states therefrom to provide motor drive or regeneration functionality. The TPIM 19 is operable to generate torque commands for Motors A and B, $T_{A\_CMD}$ and $T_{B\_CMD}$, based upon input from the HCP 5, which is driven by operator input through UI 13 and system operating parameters. The predetermined torque commands for Motors A and B, $T_{A\_CMD}$ and $T_{B\_CMD}$, are adjusted with motor damping torques, $T_{A\_DAMP}$ and $T_{B\_DAMP}$, to determine motor torques, $T_A$ and $T_B$, which are implemented by the control system, including the TPIM 19, to control the motors A and B. Individual motor speed signals, $N_A$ and $N_B$ for Motor A and Motor B respectively, are derived by the TPIM 19 from the motor phase information or conventional rotation sensors. The TPIM 19 determines and communicates motor speeds, $N_A$ and $N_B$, to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned controllers is preferably a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the controllers are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3, 6.25, 15, 25 and 100 milliseconds during ongoing engine and vehicle operation. Alternatively, algorithms may be executed in response to occurrence of an event.

In response to an operator's action, as captured by the UI 13, the supervisory HCP controller 5 and one or more of the other controllers determine required transmission output torque, $T_o$. Selectively operated components of the hybrid transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission, which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electromechanical hybrid transmission, includes output member 64 which receives output power through two distinct gear trains within the transmission 10, and operates in several transmission operating modes, described with reference now to FIG. 1, and Table 1, below.

TABLE 1

| Transmission Operating Mode | Actuated Clutches | |
| --- | --- | --- |
| Mode I | C1 70 | |
| Fixed Ratio 1 | C1 70 | C4 75 |
| Fixed Ratio 2 | C1 70 | C2 62 |
| Mode II | C2 62 | |
| Fixed Ratio 3 | C2 62 | C4 75 |
| Fixed Ratio 4 | C2 62 | C3 73 |

The various transmission operating modes described in the table indicate which of the specific clutches C1, C2, C3, C4 are engaged or actuated for each of the operating modes. Additionally, in various transmission operating modes, Motor A 56 or Motor B 72 may each operate as electrical motors, designated as MA, MB respectively, and whether motor A 56 is operating as a generator, designated as GA. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 60 to the carrier 52 of the third planetary gear set 28. Other factors outside the scope of the invention affect when the electrical machines 56, 72 operate as motors and generators, and are not discussed herein.

The control system, shown primarily in FIG. 2, is operable to provide a range of transmission output speeds, $N_o$, of shaft 64 from relatively slow to relatively fast within each mode of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e. either clutch C1 62 or C2 70, and by the controlled speed and torque of the motor/generators 56 and 72. Certain ranges of operation are described below in which fixed ratios are achieved by applying an additional clutch. This additional clutch may be clutch C3 73 or C4 75, as shown in the table, above.

When the additional clutch is applied, fixed ratio of input-to-output speed of the transmission, i.e. $N_I/N_O$, is achieved. The rotations of the motor/generators 56, 72 are dependent on internal rotation of the mechanism as defined by the clutching and proportional to the input speed, $N_I$, determined or measured at shaft 12. The motor/generators function as motors or generators. They are completely independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from Motors A and B, through planetary gear set 28 by accepting power from the energy storage device 74.

The transmission operating mode can be switched between Fixed Ratio operation and Mode operation by activating or deactivating one the additional clutches during Mode I or Mode II operation. Determination of operation in fixed ratio or mode control is by algorithms executed by the control system, and is outside the scope of this invention.

The modes of operation may overlap the ratio of operation, and selection depends again on the driver's input and response of the vehicle to that input. RANGE 1 falls primarily within mode I operation when clutches C1 70 and C4 75 are engaged. RANGE 2 falls within mode I and mode II when clutches C2 62 and C1 70 are engaged. A third fixed ratio range is available primarily during mode II when clutches C2 62 and C4 75 are engaged, and a fourth fixed ratio range is available during mode II when clutches C2 62 and C3 73 are engaged. It is notable that ranges of operation for Mode I and Mode II typically overlap significantly.

Output of the exemplary powertrain system described hereinabove is constrained due to mechanical and system limitations. The output speed, $N_O$, of the transmission measured at shaft 64 is limited due to limitations of engine output speed, $N_E$, measured at shaft 18, and transmission input speed, $N_O$, measured at shaft 12, and speed limitations of the electric motors A and B, designated as $+/-N_A$, $+/-N_B$. Output torque, $T_O$, of the transmission 64 is similarly limited due to limitations of the engine input torque, $T_E$, and input torque, $T_I$, measured at shaft 12 after the transient torque damper 20, and torque limitations ($T_{A\_MAX}$, $T_{A\_MIN}$, $T_{B\_MAX}$, $T_{B\_MIN}$) of the motors A and B 56, 72.

Figure 3:
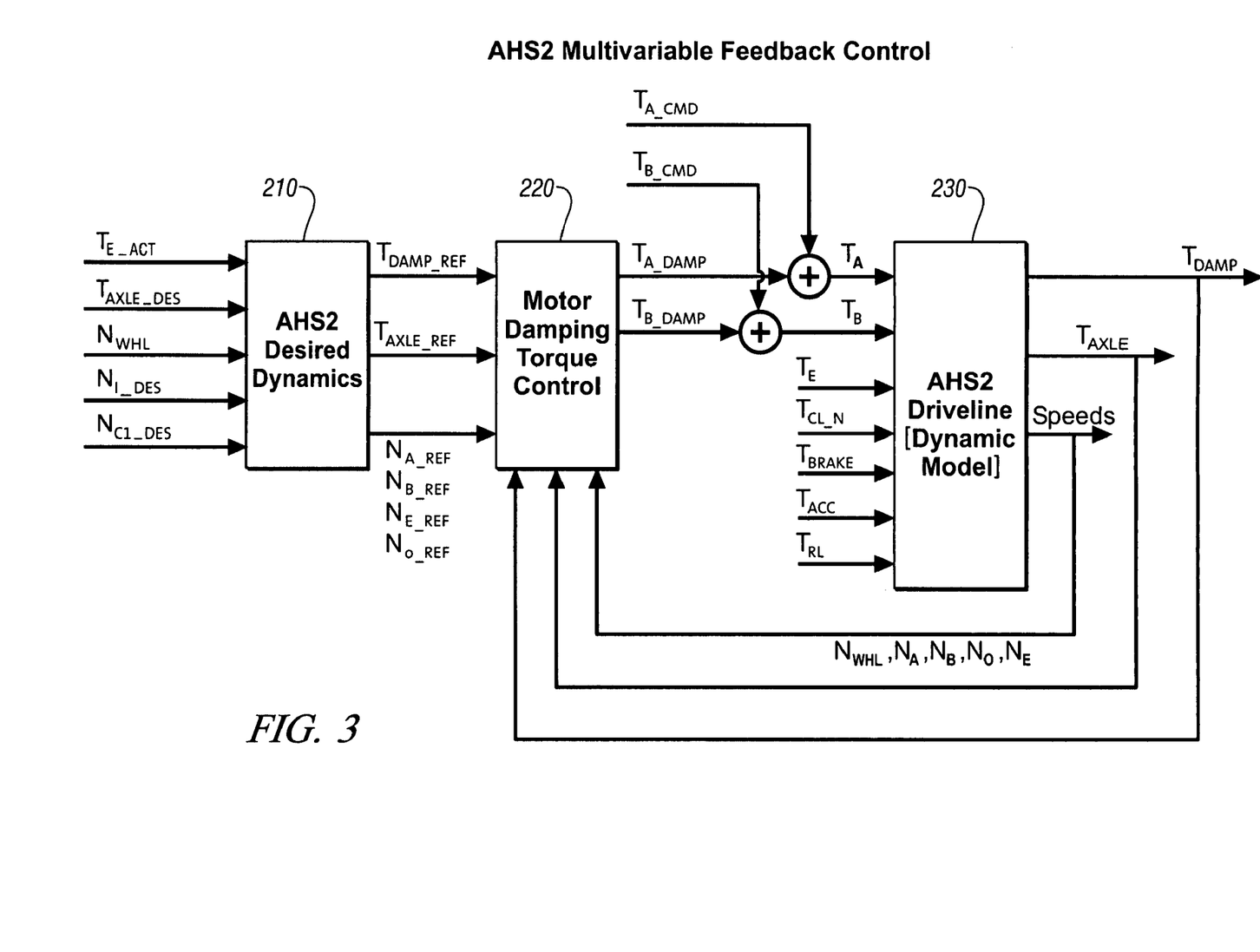
FIGS. 3, 4, and 5 are schematic information flow diagrams, in accordance with the present invention; and, FIG. 6 is a representative data graph, in accordance with the present invention.

Referring now to FIG. 3, a control scheme is shown, comprising a multivariate feedback control system preferably executed as algorithms in the controllers of the control system described hereinabove with reference to FIG. 2, to control operation of the system described with reference to FIG. 1. The control scheme described hereinafter comprises a subset of overall vehicle control architecture. The control scheme comprises a method and apparatus for multivariate active driveline damping. An exemplary method and apparatus for multivariate active driveline damping is described in commonly assigned and co-pending U.S. Ser. No. 10/xxx, xxx: entitled Method and Apparatus for Multivariate Active Driveline Damping , GP-307477. The aforementioned method and apparatus are incorporated herein by reference so that multivariate active driveline damping need not be described in detail. The exemplary multivariate feedback control method and system comprises basic elements for controlling torque outputs from the torque-generative devices 14, 56, 72 through the transmission 10 to the driveline. This includes the overall control elements of determining desired operating state parameters for the powertrain system and the driveline, which comprise inputs to the desired dynamics segment 210. Outputs of the desired dynamics segment 210 comprise a plurality of reference values for axle torque, $T_{AXLE\_REF}$; for damper torque, $T_{DAMP\_REF}$; and various speeds, $N_{A\_REF}$, $N_{B\_REF}$, $N_{O\_REF}$, $N_{E\_REF}$, $N_{WHL\_REF}$. The reference values and the plurality of operating state errors calculated from outputs of the driveline comprise inputs to a motor damping torque control scheme 220. The motor damping torque control scheme 220 is executed to determine damping torques to the torque-generative devices, in this embodiment to Motors A and B, i.e. $T_{A\_DAMP}$ and $T_{B\_DAMP}$. Driveline dynamic control, shown as 230, comprises controlling inputs to each torque-generative device and other torque devices in the transmission and driveline, based upon the operating state errors and, the reference states.

Figure 4:
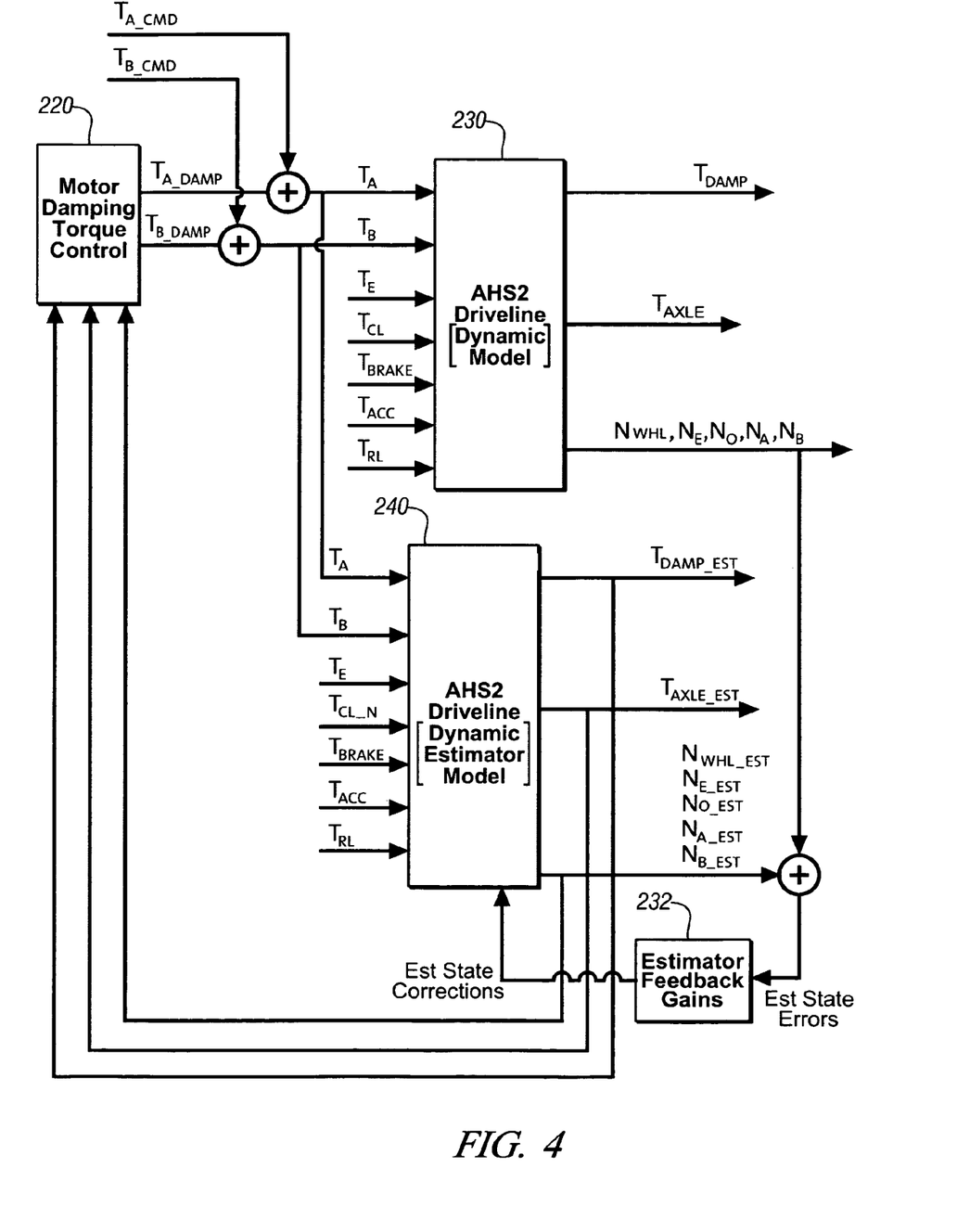

Referring now to FIG. 4, the method and apparatus for estimating state parameters for multivariate driveline having a driveline dynamics estimator 240, is shown. An exemplary method and apparatus for multivariate active driveline damping is described in commonly assigned and co-pending U.S. Ser. No. 10/xxx,xxx: entitled Parameter State Estimation, GP-307478. In overall operation, the driveline dynamics estimator 240 is a mathematical model comprising a plurality of linear equations executed as algorithms within one of the controllers. The mathematical model equations, including calibration values, are executed using algorithms to model representations of operation of the exemplary driveline described with reference to FIGS. 1 and 2, taking into account application-specific masses, inertias, friction factors, and other characteristics and parameters of the driveline that affect various operating states. The method to estimate state parameters for the aforementioned powertrain system includes monitoring operating rotational speed for each of the torque-generative devices, in this case Motor A 56, Motor B 72, and engine 14. The engine output speed, NE, is measured at shaft 18, and transmission input speed, $N_1$, is measured at shaft 12. Output rotational speed, No, of the transmission 10 at shaft 64 is measured. Torque commands from the control system to the torque-generative devices are determined and referred to as $T_A$, $T_B$, and $T_E$. A plurality of driveline torque loads are also determined and used as input. The aforementioned mathematical model equations are executed in one of the controllers to estimate each state parameter, including $T_{DAMP}$, $T_{AXLE}$, $N_A$, $N_B$, $N_O$, $N_E$, $N_{WHL}$, using as inputs: the operating speed for each of the torque-generative devices, the output speed of the transmission device, the torque commands to the torque-generative devices, and the torque loads. The distributed controller architecture described with reference to FIG. 2, and the algorithmic structure described herein is executed in a manner that causes estimation of the aforementioned state parameters to be achieved in real-time, i.e. calculation of each estimated state occurs during a single clock cycle of the controller so there is limited or no lag time in determining the various states, thus eliminating or minimizing potential for loss of control of the system. Input parameters to the driveline dynamics estimator 240 include motor torque values, $T_A$ and $T_B$, engine torque $T_E$, clutch torques $T_{CL\_N}$, to clutches C1, C2, C3, C4, brake torque $T_{BRAKE}$, accessory load $T_{ACC}$, and road load, $T_{RL}$, and the transmission operating mode. The mathematical model equations are applied to the aforementioned inputs to dynamically calculate estimated output state parameters of the driveline, including $T_{DAMP\_EST}$, $T_{AXLE\_EST}$, $N_{A\_EST}$, $N_{B\_EST}$, $N_{o\_EST}$, $N_{E\_EST}$, and $N_{WHL}$, based upon the input parameters. A first speed matrix comprising the estimated speeds $N_{A\_EST}$, $N_{B\_EST}$, $N_{o\_EST}$, $N_{E\_EST}$, $N_{WHL\_EST}$ is subtracted from a second speed matrix comprising measured speeds $N_A$, $N_B$, $N_o$, $N_E$, $N_{WHL}$ output from driveline dynamic control 230. The resultant matrix is input to an estimator 232, wherein it is multiplied by one of a plurality of gain matrices, to determine a matrix of estimated state corrections. Each of the gain matrices comprises a matrix of scalar gain factors, preferably determined for each transmission operating mode, i.e. the specific operating mode and gear configuration, described hereinabove with reference to Table 1. In this embodiment the gain matrices are determined off-line, and stored as calibration values in one of the on-board controllers. There are preferably at least two sets of gain matrices developed and executed as part of the estimator feedback gain 232 action, wherein one set is for use when the driveline is in a neutral lash state, and one set is for use when the driveline is in a drive state.

The matrix of estimated state corrections is used as feedback by the driveline dynamics estimator 240 in determining the dynamically calculated estimated output states of the driveline, including $T_{DAMP\_EST}$, $T_{AXLE\_EST}$, $N_{A\_EST}$, $N_{B\_EST}$, $N_{o\_EST}$, $N_{E\_EST}$, $N_{WHL\_EST}$ based upon the input parameters. When the first speed matrix comprising the estimated speeds is equal to the second speed matrix comprising measured speeds, it is determined that the outputs of the estimator, comprising $T_{DAMP\_EST}$, $T_{AXLE\_EST}$, $N_{A\_EST}$, $N_{B\_EST}$, $N_{0\_EST}$, $N_{E\_EST}$, $N_{WHL\_EST}$ are accurate measurements of actual operating states of the driveline.

Figure 5:
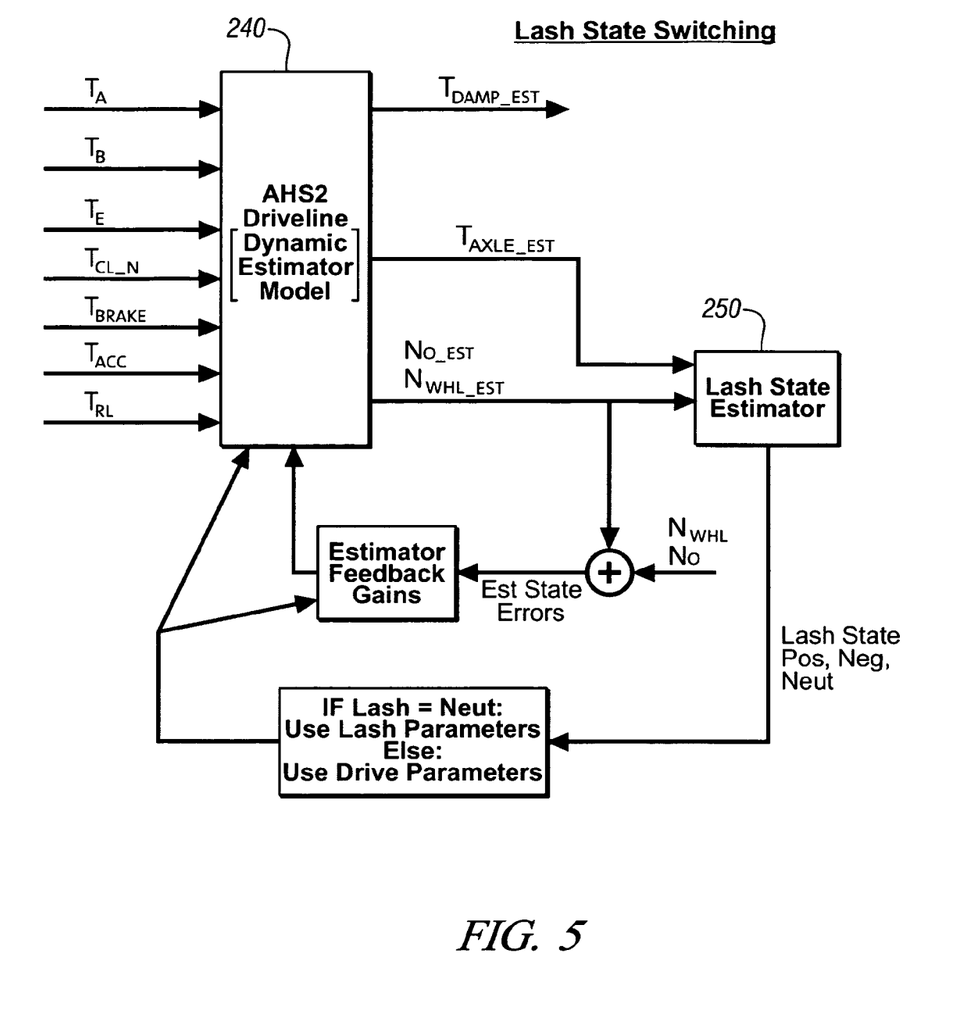
Figure 6:
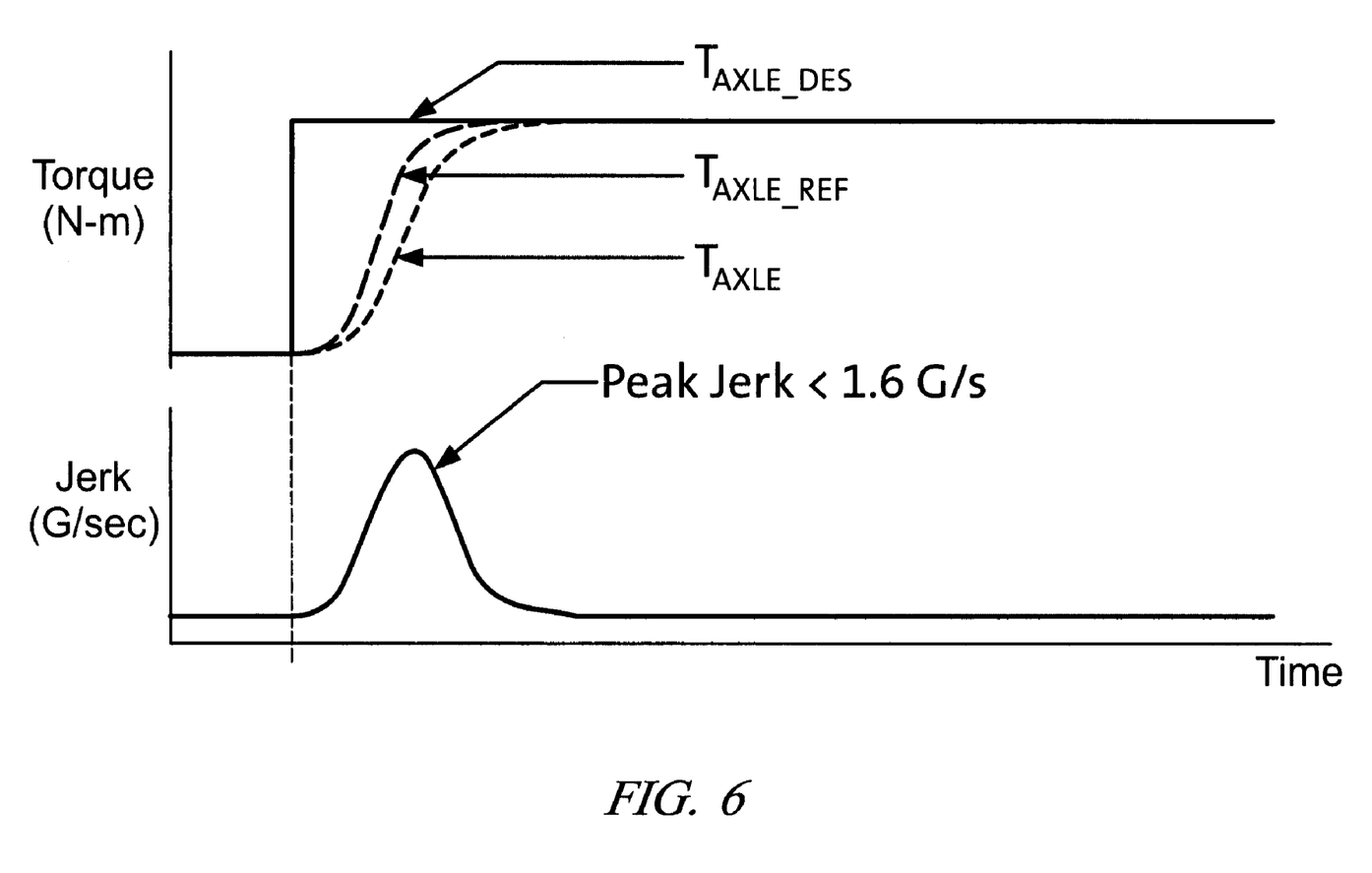

Referring now to FIGS. 5 and 6, a method to control torque transmitted from the powertrain system described with reference to FIGS. 1 and 2 during transitions that can result in driveline jerks is described in detail. The controlled torque, $T_{AXLE}$, is transmitted to the axle 92 of the driveline. The method and system described herein are executed as one or more algorithms in the distributed controller architecture shown with reference to FIG. 2, and utilizes the multivariate feedback control scheme described with reference to FIG. 3, including parameter state estimation described with reference to FIG. 4, each incorporated by reference, as detailed hereinabove.

The method to control driveline torque originating in the powertrain system which has the torque-generative devices 14, 56, 72, operable to transmit motive torque to the transmission comprises determining a desired axle torque, $T_{AXLE\_DES}$, and determining output speeds of the powertrain $N_o$, and driven wheel, $N_{WHL}$ of the driveline. Each of the torque-generative devices 14, 56, 72 is controlled using the aforementioned and referenced multivariate control system, based upon a time-rate change in the desired axle torque, $T_{AXLE\_DES}$_dot. The torque-generative devices are driven, and limited in operation based upon the time-rate change in desired axle torque, $T_{AXLE\_DES}$_dot when the output speed of the driven wheel, $N_{WHL}$ is less than a predetermined value, typically from a zero speed launch. This time-rate change may be further controlled based upon the time-rate change in desired axle torque, which includes a transition of one of the motor/generators between a torque-generative mode and an electric-generative mode. This includes controlling driveline torque, $T_{AXLE\_DES}$ during vehicle launch, and controlling driveline torque $T_{AXLE\_DES}$ during a change in gear ratio of the transmission 10.

The following parameters are determined: powertrain torque transmitted to the driveline, i.e. $T_{AXLE}$, output speed of the transmission, $N_o$, to the driveline, and driven wheel speed, $N_{WHL}$. A lash state is determined, and each of the torque-generative devices of the powertrain is controlled based upon the lash state. In this embodiment, the lash state is determined using an estimator 250, which preferably comprises an algorithm within one of the controllers. Inputs to the lash state estimator 250 include estimated axle torque, $T_{AXEL\_EST}$, estimated output speed, $N_{o\_EST}$ of the transmission, and estimated driven wheel speed, $N_{WHL\_EST}$, each of which is output from the driveline dynamics estimator 240. The lash state estimator 250 is operable to compare the estimated axle torque, $T_{AXLE\_EST}$ and estimated output speed, $N_{o\_EST}$ to determine the lash state to be one of a positive state, a negative state, or a neutral state. The positive state is indicated when the estimated axle torque, $T_{AXLE\_EST}$ and estimated output speed, $N_{o\_EST}$ and estimated driven wheel speed, $N_{WHL\_EST}$, show torque being transmitted from the transmission through the driveline in a forward direction, i.e. when the vehicle is driven in a forward motion. The negative state is indicated when the estimated axle torque, $T_{AXLE\_EST}$ and estimated output speed, $N_{o\_EST}$ and estimated driven wheel speed, $N_{WHL\_EST}$, show torque being transmitted from the transmission through the driveline in a negative direction, i.e. when the vehicle is driven in a reverse motion, or when there is a powertrain braking and regeneration mode. The neutral state is indicated when there is no torque being transmitted to the driven wheels through the driveline from the transmission.

When output of the lash state estimator indicates a positive lash state or a negative lash state, no action occurs in the control system based upon the lash.

When output of the lash state estimator indicates a neutral state, the resultant matrix comprising the aforementioned difference between the first estimated speed matrix (comprising $N_{A\_EST}$, $N_{B\_EST}$, $N_{O\_EST}$, $N_{E\_EST}$, $N_{WHL\_EST}$) and the second measured speed matrix (comprising $N_A$, $N_B$, $N_o$, $N_E$, $N_{WHL}$) is multiplied by one of a plurality of lash gain matrices, to determine a matrix of estimated state corrections for lash operation. When the matrix of estimated state corrections for lash operation is used in the driveline dynamics estimator 240, the resultant outputs of the estimator 240, comprising $T_{DAMP\_EST}$, $T_{AXLE\_EST}$, $N_{A\_EST}$, $N_{B\_EST}$, $N_{0\_EST}$, $N_{E\_EST}$, $N_{WHL\_EST}$, are provided as feedback to the multivariate motor damping control 220. The multivariate motor damping control 220 uses the estimator outputs to dampen actual axle torque output, $T_{AXLE}$ during the period of time in which the neutral lash state is detected. Thus, the torque transmitted to the driveline, $T_{AXLE}$ is less than operator-commanded torque, $T_{AXLE\_DES}$ when the lash state is neutral. When the lash state subsequently becomes either positive or negative, use of the lash gain matrices is discontinued, and a gain matrix is selected as previously described with reference to FIG. 4.

Referring now to FIG. 6, exemplary results are shown for management of axle torque during a period when a potential for driveline jerk may occur. Driveline jerk is defined as a rate of change of axle torque due to a step-change in desired axle torque, such as results from operator input to the UI 13.

Such changes typically occur during vehicle launch, and other points of acceleration. Driveline jerk may also occur due to a transition in operating mode of one of the motor/generators 56, 72, e.g. between a torque-generative mode and an electrical energy generative mode. A typical constraint in magnitude of jerk, driven by operator expectations, comprises a peak jerk, or acceleration, of less than 1.6 G/sec. In this instance, desired axle torque, $T_{AXLE\_DES}$, is determined based upon operator inputs, and adjusted with filtering constants executed in the desired dynamics scheme 210. The torque limitation is preferably accomplished by controlling damping torque values for Motor A and Motor B, $T_{A\_DAMP}$ and $T_{B\_DAMP}$, calculated with reference to the multivariate motor damping torque control 220, previously referenced and described. The multivariate motor damping control 220 uses the estimator outputs to dampen actual axle torque output, $T_{AXLE}$. Thus, the torque transmitted to the driveline, $T_{AXLE}$, is less than operator-commanded torque, $T_{AXLE\_DES}$ when the desired axle torque is jerk-limited. In this manner the multivariate feedback control scheme is useable to manage and suppress magnitude and occurrence of driveline clunks or jerks.

Input parameters to the driveline dynamics estimator 240 include motor torque values, $T_A$ and $T_B$, engine torque $T_E$, clutch torques $T_{CL\_N}$, to clutches C1, C2, C3, C4, brake torque $T_{BRAKE}$, accessory load $T_{ACC}$, and road load, $T_{RL}$, and the transmission operating mode. The mathematical model equations are applied to the aforementioned inputs to dynamically calculate estimated output state parameters of the driveline, including $T_{DAMP\_EST}$, $T_{AXLE\_EST}$, $N_{A\_EST}$, $N_{B\_EST}$, $N_{O\_EST}$, $N_{E\_EST}$, $N_{WHL\_EST}$, based upon the input parameters. The first speed matrix comprising the estimated speeds is subtracted from the second speed matrix comprising measured speeds, as previously described. The resultant matrix is multiplied by one of a plurality of gain matrices, to determine the matrix of estimated state corrections. Each of the plurality of gain matrices comprises a matrix of scalar gain factors, preferably determined for each transmission operating mode, i.e. the specific operating mode and gear configuration, described hereinabove with reference to Table 1. In this embodiment the gain factors are determined off-line, and stored as calibration values in one of the on-board controllers. There are preferably at least two sets of gain matrices developed and executed as part of the estimator feedback gain 232 action, wherein one set is for use when the driveline is in a neutral lash state, and one set is for use when the driveline is in a drive state.

The matrix of estimated state corrections is used as feedback by the driveline dynamics estimator 240 in determining the dynamically calculated estimated output states of the driveline, including $T_{DAMP\_EST}$, $T_{AXLE\_EST}$, $N_{A\_EST}$, $N_{B\_EST}$, $N_{O\_EST}$, $N_{E\_EST}$, $N_{WHL\_EST}$ based upon the input parameters. When the first speed matrix comprising the estimated speeds is equal to the second speed matrix comprising measured speeds, it is determined that the outputs of the estimator, comprising $T_{DAMP\_EST}$, $T_{AXLE\_EST}$, $N_{A\_EST}$, $N_{B\_EST}$, $N_{O\_EST}$, $N_{E\_EST}$, $N_{WHL\_EST}$ are accurate measurements of actual operating states of the driveline.

Although this embodiment has been described as controlling output of the electric motors, it is understood that alternate embodiments of this invention can include control schemes which are operable to control the torque output of the internal combustion engine as well as the electric motors. It is further understood that some or all of the estimated values for torque and speed can instead be monitored directly with sensors and sensing schemes.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to control motive torque to a driveline of a system, the system comprising a plurality of torque-generative devices operably connected to a transmission operable to transmit motive torque to an axle of the driveline, comprising:
   determining a desired axle torque;
   determining an output speed of the transmission and an output speed of a driven wheel of the driveline; and,
   controlling one of the torque-generative devices based upon a time-rate change in the desired axle torque.

2. The method of claim 1, further comprising controlling each of the torque-generative devices based upon a time-rate change in desired axle torque when the output speed of the driven wheel is less than a predetermined value.

3. The method of claim 1, wherein determining the desired axle torque comprises monitoring operator input to an accelerator pedal.

4. The method of claim 3, wherein determining the desired axle torque further comprises monitoring operator input to a brake pedal.

5. The method of claim 4, wherein the method further comprises controlling driveline torque during vehicle launch.

6. The method of claim 1, wherein controlling each torque-generative device based upon a time-rate change in desired axle torque comprises controlling transition between a torque-generative mode and an electric-generative mode when the torque-generative device comprises an electrical machine.

7. The method of claim 1, wherein the method further comprises controlling driveline torque during a change in a fixed gear ratio of a transmission of the powertrain.

8. Article of manufacture for effecting a method to control driveline torque in a powertrain system having a plurality of torque-generative devices operable to transmit motive torque to the driveline, comprising:
   a storage medium having a computer program encoded therein, said computer program comprising:
   code to determine output speeds of a powertrain and a driven wheel of the driveline;
   code to determine a desired axle torque; and,
   code to control each of the torque-generative devices based upon a time-rate change in the desired axle torque.

9. The article of manufacture of claim 8, further comprising code to control each of the torque-generative devices based upon a time-rate change in desired axle torque when output speed of the driven wheel is less than a predetermined value.

10. The article of manufacture of claim 8, wherein code to control each torque-generative device based upon a time-rate change in desired axle torque further comprises code to control torque output from each torque-generative device when the torque-generative device is operated as an electric motor.

11. The article of manufacture of claim 8, wherein the torque-generative devices comprise a first electrical machine.

12. The article of manufacture of claim 11, wherein the torque-generative devices further comprise a second electrical machine.

13. The article of manufacture of claim 12, wherein code to control each torque-generative device based upon a time-rate change in desired axle torque comprises code to control torque output of the first and second electrical machines.

14. The article of manufacture of claim 13, wherein the torque-generative devices further comprise an internal combustion engine.

15. The article of manufacture of claim 8, wherein code to determine a desired axle torque comprises code to estimate desired axle torque based upon an operator input.

16. The article of manufacture of claim 8, wherein code to determine output speeds of the powertrain and the driven wheel of the driveline comprises code to measure output speeds of the powertrain and a driven wheel of the driveline with sensing devices.

17. The article of manufacture of claim 8, wherein code to determine output speeds of the powertrain and the driven wheel of the driveline comprises code to estimate output speeds of the powertrain and the driven wheel of the driveline based upon input from a sensing device.

18. The article of manufacture of claim 17, wherein the code to estimate output speeds of the powertrain and the driven wheel of the driveline based upon inputs from a sensing device further comprises code to execute a multivariate method for estimating output speeds.

* * * * *